US012601625B2

(12) United States Patent
Nilsson

(10) Patent No.: US 12,601,625 B2
(45) Date of Patent: Apr. 14, 2026

(54) LOOP-POWERED FIELD DEVICE WITH IMPROVED LOOP CURRENT CONTROL

(71) Applicant: Rosemount Tank Radar AB, Mölnlycke (SE)

(72) Inventor: Leif Nilsson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 286 days.

(21) Appl. No.: 18/351,736

(22) Filed: Jul. 13, 2023

(65) Prior Publication Data

US 2024/0085233 A1 Mar. 14, 2024

(30) Foreign Application Priority Data

Sep. 9, 2022 (EP) ..................................... 22194779

(51) Int. Cl.
*G01F 23/284* (2006.01)
*H02J 1/06* (2006.01)

(52) U.S. Cl.
CPC .............. *G01F 23/284* (2013.01); *H02J 1/06* (2013.01)

(58) Field of Classification Search
CPC ........ G01F 23/284; G01F 23/804; H02J 1/06; G01S 7/282; G01S 13/88; G01D 21/02
See application file for complete search history.

(56) References Cited

U.S. PATENT DOCUMENTS

| | | | | |
|---|---|---|---|---|
| 6,972,584 B1 * | 12/2005 | Ferreira | ................ | G01F 23/284 |
| | | | | 73/627 |
| 8,477,064 B2 | 7/2013 | Nilsson | | |

| | | | | |
|---|---|---|---|---|
| 2004/0074295 A1 | 4/2004 | Michalski et al. | | |
| 2013/0271156 A1 | 10/2013 | Schleith et al. | | |
| 2016/0341767 A1 * | 11/2016 | Nyberg | .................... | G05F 1/46 |

FOREIGN PATENT DOCUMENTS

WO WO-2021194368 A1 * 9/2021 ....... G05B 19/41865

OTHER PUBLICATIONS

Communication—Extended European Search Report from European Patent Application No. 22194779.9, dated Feb. 7, 2023.

* cited by examiner

*Primary Examiner* — Robert W Hodge
*Assistant Examiner* — Bongani Jabulani Mashele
(74) *Attorney, Agent, or Firm* — Westman, Champlin & Koehler, P.A.

(57) ABSTRACT

A field device comprising a first loop terminal and a second loop terminal; a measurement unit; a loop current control device for controlling the loop current to encode a process variable determined by the measurement unit, the loop current control device being provided in the electric circuit between the first loop terminal and an a first node of the electric circuit; an asymmetrically conducting device provided in the electric circuit between the first node of the electric circuit and a second node of the electric circuit; an energy storage device in the electric circuit between the second node of the electric circuit and the second loop terminal; and a controllable shunt regulator provided in the electric circuit between the first node of the electric circuit and the second loop terminal, wherein the measurement unit is in the electric circuit between the second node and the second loop terminal.

10 Claims, 6 Drawing Sheets

LOOP-POWERED FIELD DEVICE WITH IMPROVED LOOP CURRENT CONTROL

CROSS-REFERENCE TO RELATED APPLICATION

This application claims priority to European Patent Application No. 22194779.9, filed Sep. 9, 2022, the content of which is hereby incorporated by reference in its entirety.

FIELD OF THE INVENTION

The present invention relates to a field device for determining a process variable and providing the process variable to a remote location via a two-wire current loop.

BACKGROUND OF THE INVENTION

Field devices are often used in the industry to measure various process variables, such as pressure, temperature, flow, or product level. In particular, a radar level gauge system may be used for measuring the level of a product such as a process fluid, a granular compound, or another material.

In a radar level gauge system, an electromagnetic transmit signal may be propagated from a transceiver arranged at the top of a tank towards a surface of a product in the tank, and an electromagnetic reflection signal, resulting from reflection of the transmit signal at the surface, returns to the transceiver. Based on the transmit signal and the reflection signal, the distance to the surface of the product can be determined, from which the level of the product in the tank can be deduced.

In many facilities, such as process industrial facilities, where field devices are used, there is existing wiring between the field device and a remote location, such as a host. The existing wiring often forms a two-wire current loop for communication of commands from the host to the field device and a measurement signal indicative of a process variable from the field device to the host. Communication on the two-wire current loop may take place by controlling the current flowing through the loop. In a 4-20 mA loop, the measurement signal may, for example, be the loop current itself. As an alternative or complement to such an analog current level, digital information may be communicated by modulating the loop current, for example using the HART-protocol. Alternatively, the two-wire current loop may be used for all-digital communication, for example using the FOUNDATION™ Fieldbus communication protocol.

In addition to be able to receive and send signals over the two-wire current loop, the field device may need to be able to operate using electric power drawn from the two-wire current loop. In other words, the field device may be a loop-powered field device.

For certain types of field devices and/or measurement situations, the two-wire current loop may, at times, carry less power than is needed for operation of the field device.

Therefore, some loop-powered field devices are provided with an energy storage device, and operate intermittently using energy stored by the energy storage device. When more power is carried by the two-wire current loop than is needed for operation of the field device, energy may be stored in the energy storage device, until the energy storage device is full. When the two-wire current loop does not carry sufficient power for operation of the field device, energy may be drawn from the energy storage device, if available.

One such loop-powered field device is described in US 2004/0074295, where an energy storing capacitor is coupled in parallel with a Zener diode for limiting the voltage across the energy storing capacitor. In the field device according to US 2004/0074295, the measurement circuit of the field device is activated at the earliest, when the energy in the energy storing capacitor has reached a predetermined level.

It would be desirable to provide an improved loop-powered field device, in particular allowing improved handling of situations with rapid changes in the loop current.

SUMMARY OF THE INVENTION

It is an object of the present invention to provide an improved loop-powered field device, in particular allowing improved handling of situations with rapid changes in the loop current.

According to a first aspect of the present invention, it is therefore provided a field device for determining a process variable and providing the process variable to a remote location via a two-wire current loop, the field device comprising: a first loop terminal and a second loop terminal for connection of the field device to the two-wire current loop in such a way that a loop current flows through an electric circuit of the field device from the first loop terminal to the second loop terminal; a measurement unit for determining the process variable using energy received via the two-wire current loop for operation of the measurement unit; a loop current control device for controlling the loop current to encode the process variable determined by the measurement unit, the loop current control device being provided in the electric circuit between the first loop terminal and a first node of the electric circuit; an asymmetrically conducting device provided in the electric circuit between the first node of the electric circuit and a second node of the electric circuit, the asymmetrically conducting device being configured to allow current to flow through the asymmetrically conducting device from the first node towards the second node, and to substantially prevent current to flow through the asymmetrically conducting device from the second node towards the first node; an energy storage device for storing energy received via the two-wire current loop, the energy storage device being provided in the electric circuit between the second node of the electric circuit and the second loop terminal; and a controllable shunt regulator provided in the electric circuit between the first node of the electric circuit and the second loop terminal, in parallel with the energy storage device and the asymmetric conducting device, wherein the measurement unit is provided in the electric circuit between the second node of the electric circuit and the second loop terminal in parallel with the energy storage device.

By a "field device" should be understood any device that determines a process variable and communicates a measurement signal indicative of that process variable to a remote location. Examples of field devices include devices for determining process variables such as filling level, temperature, pressure, fluid flow etc.

As was also mentioned in the Background section, the measurement signal may, for example, be a constant current and/or a time-varying current superimposed on a constant current. Such a time-varying current may modulate digital information, for example according to the HART communication protocol.

The measurement unit may comprise a power converter for converting an input power from the two-wire current loop to an output power for powering measurement circuitry comprised in the measurement unit. Such a power converter may be configured to convert an input voltage across input terminals of the power converter to an output voltage across output terminals of the power converter. The measurement unit may have a first and second power terminals. The first power terminal of the measurement unit may be connected to the second node of the electric circuit of the field device, and the second power terminal of the measurement unit may be connected to the second loop terminal of the field device. In embodiments where the measurement unit comprises a power converter, the first and second power terminals of the measurement unit may be first and second input terminals of the power converter.

The present invention is based on the realization that a circuit configuration with an asymmetrically conducting device in series with the loop current control device and the energy storage device, and a controllable shunt regulator in parallel with the asymmetrically conducting device and the energy storage device, and in series with the loop current control device has several characteristics that may be beneficial for a loop-powered field device.

Underlying this realization is the insight that the terminal voltage (the voltage across the input terminals of the field device received from the two-wire current loop) typically varies when the loop current varies, due to the inherent (resistive) impedance of the two-wire current loop, mainly outside the field device between the remote location and the field device. A lower loop current results in a smaller potential drop across the impedance of the two-wire current loop, and thus to an increased terminal voltage across the first and second loop terminals of the field device.

Through the provision of a controllable shunt regulator, the allowed voltage across the energy storage device can be increased when the terminal voltage increases (when the loop current is decreased). This provides for more efficient use of the energy available on the two-wire current loop.

Analogously, when the loop current is increased, a predefined minimum power can be received from the loop at a lower terminal voltage. The controllable shunt regulator can then be controlled to reduce the shunting voltage (the voltage at which at least a part of the loop current is routed through the controllable shunt regulator), providing for a lower voltage at which the field device can be operational—a lower so-called lift-off voltage.

Furthermore, in the event of an increase in the loop current when the energy storage device is "full" (charged to exhibit a voltage across the energy storage device which is at the shunting voltage of the controllable shunt regulator) or almost "full", the provision of the asymmetrically conducting device connected in series between the loop current control device and the energy storage device allows the voltage across the loop current control device to remain substantially constant, without requiring discharge of the energy storage device through the controllable shunt regulator. Instead, the voltage across the loop current control device can be kept constant by passing only the loop current through the controllable shunt regulator. This is much less current than would need to pass through the controllable shunt regulator to reduce the voltage across the energy storage device to the required level sufficiently fast to keep the voltage across the loop current control device constant. Furthermore, smaller variations in the current in the electric circuit of the field device provide for smaller variations (transients and/or noise) in the loop current, which in turn ensures compliance with existing requirements for HART-communication over the two-wire current loop. Moreover, the controllable shunt regulator does not have to be configured for high currents, which provides for a simpler and more cost-efficient circuit configuration.

The field device according to embodiments of the present invention may advantageously be a radar level gauge for determining a filling level of a product in a tank, the measurement unit of the radar level gauge comprising: a transceiver for generating, transmitting and receiving electromagnetic signals; a propagating device connected to the transceiver for propagating an electromagnetic transmit signal from the transceiver towards a surface of the product and for returning to the transceiver an electromagnetic reflection signal resulting from reflection of the transmit signal at the surface; and processing circuitry for determining the filling level based on the transmit signal and the reflection signal, and for controlling the loop current control device to control the loop current to encode the filling level.

The processing circuitry may be configured to control the transceiver to perform a plurality of measurement cycles, each measurement cycle including: an active time period in which the transceiver generates, transmits and receives the electromagnetic signals; and an inactive time period in which the transceiver does not generate, transmit and receive the electromagnetic signals.

In summary, the present invention thus relates to a field device comprising a first loop terminal and a second loop terminal; a measurement unit; a loop current control device for controlling the loop current to encode a process variable determined by the measurement unit, the loop current control device being provided in the electric circuit between the first loop terminal and an a first node of the electric circuit; an asymmetrically conducting device provided in the electric circuit between the first node of the electric circuit and a second node of the electric circuit; an energy storage device in the electric circuit between the second node of the electric circuit and the second loop terminal; and a controllable shunt regulator provided in the electric circuit between the first node of the electric circuit and the second loop terminal, wherein the measurement unit is in the electric circuit between the second node and the second loop terminal.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

In the present detailed description, an exemplary embodiment of the field device according to the present invention is discussed with reference to a non-contact radar level gauge system. It should be noted that this by no means limits the scope of the present invention, which is equally applicable to other field devices, such as guided wave radar level gauge systems, temperature sensors, pressure sensors, etc. Moreover, the two-wire current loop may be configured to function according to various communication standards, such as 4-20 mA, HART, Foundation Fieldbus, Profibus etc.

Figures 1, 2:
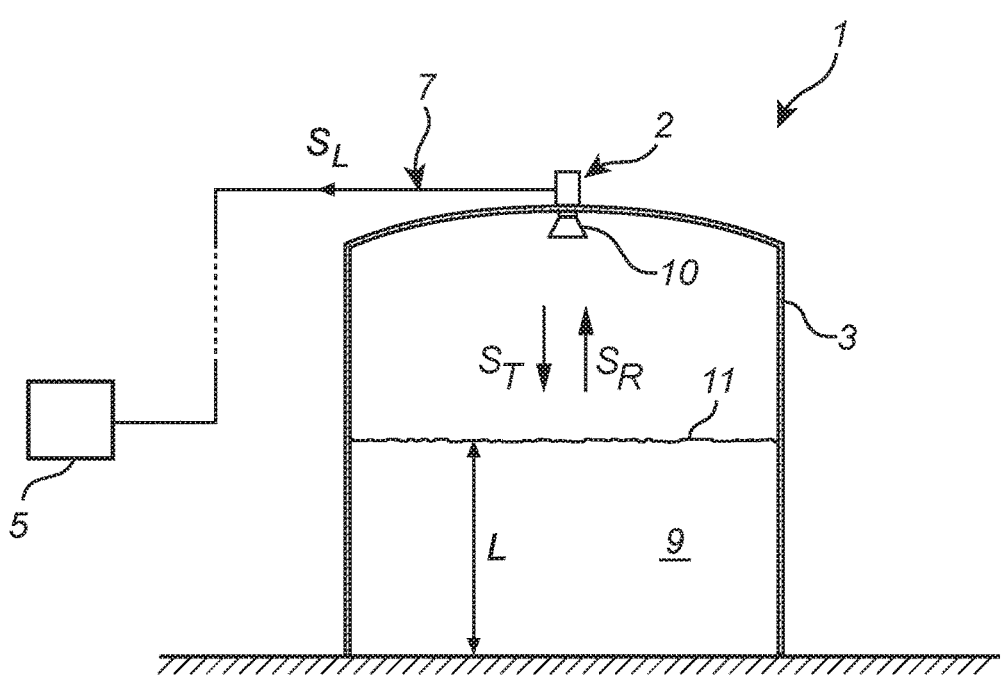
FIG. 1 schematically illustrates a measurement system including an exemplary field device, here in the form of a radar level gauge, installed at a tank.
FIG. 2 is a block diagram of two-wire current loop and a loop powered field device connected to the current loop.

FIG. 1 schematically illustrates a measurement system 1 including a field device 2 in the form of a radar level gauge installed at an exemplary tank 3. The field device 2 is connected to a remote host/master 5 via a two-wire current loop 7, which is also used to provide power to the field device 2. The tank 3 contains a product 9 and, when in operation, the field device 2 (radar level gauge) determines the filling level L of the product 9 in the tank 3 based on an electromagnetic transmit signal Sr propagated towards the surface 11 of the product 9 by an antenna 10, and an electromagnetic reflection signal SR resulting from reflection of the transmit signal Sr at the surface 11 and received by the antenna 10.

After having determined the filling level L, which is an example of a process variable, the field device 2 provides a measurement signal SL indicative of the filling level L to the remote host/master 5 via the two-wire current loop 7.

FIG. 2 is a block diagram of two-wire current loop 7 and the field device 2 connected to the current loop 7. As is schematically shown in FIG. 2, the above-mentioned measurement signal SL is here indicated as being provided in the form of a loop current $I_L$. Furthermore, the loop voltage $V_L$ provided by the remote host/master 5, and the loop impedance $R_L$ are indicated.

Figure 3:
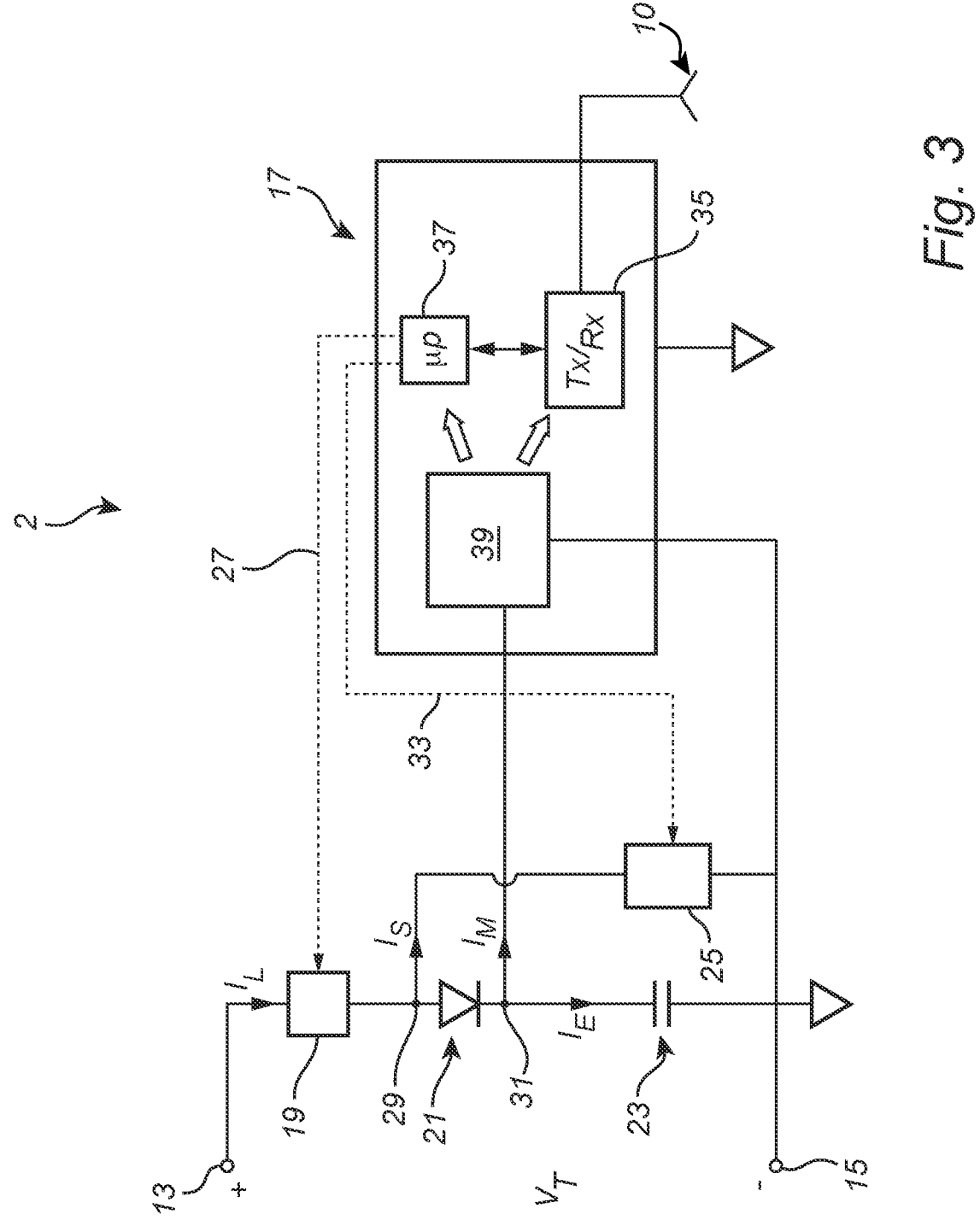
FIG. 3 is a more detailed block diagram of the field device in FIG. 2.

Referring to FIG. 3, which is a more detailed block diagram of the field device 2 in FIG. 2, the field device 2 comprises a first loop terminal 13 and a second loop terminal 15 for connection of the field device 2 to the two-wire current loop 7 (see FIG. 2) in such a way that the loop current $I_L$ flows through an electric circuit of the field device 2 from the first loop terminal 13 to the second loop terminal 15. Across the first loop terminal 13 and the second loop terminal 15 is a terminal voltage VT, which is the above-mentioned loop voltage $V_L$ minus the potential drop over the above-mentioned loop impedance $R_L$. Accordingly, the terminal voltage VT will drop in response to an increase of the loop current (because the potential drop over the loop impedance $R_L$ is proportional to the loop current $I_L$).

With continued reference to FIG. 3, the field device 2 comprises a measurement unit 17, a loop current control device 19, an asymmetrically conducting device 21, an energy storage device 23, and a controllable shunt regulator 25.

The measurement unit 17 is configured to determine the process variable (in this case the level L), and is provided in the electric circuit in such a way that it receives energy via the two-wire current loop for its operation. The maximum power available for operation of the field device 2 at any given time is determined by the loop current $I_L$ and the terminal voltage VT at that time. As is schematically indicated in FIG. 3, the measurement unit 17 may comprise a power converter 39 for converting an input power from the two-wire current loop to an output power for powering measurement circuitry comprised in the measurement unit 17. The power converter 39 may advantageously be a DC/DC switch-mode converter, whereby power losses can be minimized.

The loop current control device 19 is controllable, by the measurement unit 17 as is schematically indicated by the dotted line 27 in FIG. 3, to control the loop current $I_L$ to encode the process variable (in this case, the level L) determined by the measurement unit 17. The process variable may be encoded as an analog current value, or digitally, for example in accordance with the HART-protocol. As is indicated in FIG. 3, the loop current control device 19 is provided in the electric circuit of the field device 2, between the first loop terminal 13 and a first node 29 of the electric circuit. Various configurations of the loop current control device 19 are, per se, known to those of ordinary skill in the relevant art, and a more detailed description of the loop current control device 19 is therefore not provided herein.

The asymmetrically conducting device 21 is provided in the electric circuit of the field device 2, between the first node 29 of the electric circuit and a second node 31 of the electric circuit. The asymmetrically conducting device 21 is configured to allow current to flow through the asymmetrically conducting device 21 from the first node 29 towards the second node 31, and to substantially prevent current to flow through the asymmetrically conducting device 21 from the second node 31 towards the first node 29. The asymmetrically conducting device 21 may advantageously exhibit such asymmetric conduction properties at least within a predefined voltage range. For instance, the asymmetrically conducting device 21 may only be required to substantially prevent current to flow through the asymmetrically conducting device 21 from the second node 31 towards the first node 29 for voltages lower than a predefined voltage, which may for example be less than 10 V, where this voltage represents a potential difference between a relatively high potential at the second node 31 and a relatively low potential (in relation to the relatively high potential) at the first node 29. In FIG. 3, the asymmetrically conducting device 21 has been represented by a diode. It should, however, be understood that this is only one example of a suitable asymmetrically conducting device 21. Other possible example configurations could include additional electrical components, such as resistors, transistors, and/or additional diodes etc. It should also be noted that, for example, a diode-coupled transistor exhibits diode characteristics, and therefore functionally corresponds to a diode.

The energy storage device 23 is arranged and configured to store energy received via the two-wire current loop. As is indicated in FIG. 3, the energy storage device 23 is provided in the electric circuit of the field device 2, between the second node 31 of the electric circuit and the second loop terminal 15.

The energy storage device 23 may be a rechargeable energy storage device, which allows that a temporary surplus of energy can be stored and used later when the power required for operation of the measurement unit 17 is higher than what can be drawn from the two-wire current loop. The energy storage device 23 may, for example, comprise a capacitor, a super-capacitor and/or a rechargeable battery or any other device capable of storing electrical energy. In the example configuration of FIG. 3, the energy storage device 23 is indicated as a capacitor. It should be noted that this is simply a schematic representation, and that there may, for example, be a plurality of capacitors in parallel, etc. In embodiments where the energy storage device 23 is realized as one or several capacitors, the total capacitance of the energy storage device 23 may advantageously be at least 1 mF, depending on the power requirements of the measurement unit 17.

The controllable shunt regulator 25 is provided in the electric circuit of the field device 2, between the first node 29 of the electric circuit and the second loop terminal 15. As is shown in FIG. 3, the controllable shunt regulator 25 is coupled in parallel with the asymmetrically conducting device 21 and the energy storage device 23. As is schematically indicated by the dotted line 33 in FIG. 3, the controllable shunt regulator 25 may advantageously be controlled by the measurement unit 17 to allow a shunt current $I_S$ to pass through the controllable shunt regulator 25 when a voltage across the controllable shunt regulator 25 becomes higher than a shunting voltage. In operation the shunting voltage may be controlled by the measurement unit 17, or by other circuitry in the field device 2 to indirectly control a voltage across the loop current control device 19 towards a constant voltage. Hereby, the loop current control device 19 can achieve more stable control of the loop current $I_L$. The controllable shunt regulator 25 may comprise at least one zener diode, and shunt voltage controlling circuitry. Such shunt voltage controlling circuitry may, for example, comprise switching circuitry controllable to connect a selected number of zener diodes in series. Alternatively, or in combination, the controllable shunt regulator 25 can be realized using a circuit element controllable to start to conduct at a desired voltage across the circuit element, which may be a suitably biased FET-transistor, or one or more other functionally equivalent circuit elements. The control signal for the circuit element may be provided directly or indirectly— by the measurement unit 17.

As can be seen in FIG. 3, the measurement unit 17 is provided in the electric circuit of the field device 2 between the second node 31 of the electric circuit and the second loop terminal 15, in parallel with the energy storage device 23.

In addition to the above-mentioned loop current $I_L$ and shunt current $I_S$, the circuit diagram in FIG. 3 indicates the current $I_M$ provided to the measurement unit 17, and the current $I_E$ flowing into the energy storage device 23.

In the example configuration of FIG. 3, as was also briefly explained further above with reference to FIG. 1 and FIG. 2, the field device 2 is a radar level gauge for determining the filling level L of the product 9 in the tank 3. As is schematically indicated in FIG. 3, the measurement unit 17 may then comprise a transceiver 35 for generating, transmitting and receiving electromagnetic signals, a propagating device, such as the above-mentioned antenna 10, and processing circuitry 37. The antenna 10 is connected to the transceiver 35 for propagating an electromagnetic transmit signal Sr from the transceiver 35 towards a surface of the product and for returning to the transceiver an electromagnetic reflection signal SR resulting from reflection of the transmit signal at the surface. The processing circuitry 37 may be configured to determine the filling level L based on the transmit signal Sr and the reflection signal SR, and to control the loop current control device 19 to control the loop current $I_L$ to encode the filling level L. The processing circuitry 37 may also be configured to control the controllable shunt regulator 25.

The field device 2 (radar level gauge) may be intermittently operating, and this may be achieved by configuring the processing circuitry 37 to control the transceiver 35 to perform a plurality of measurement cycles, each measurement cycle including an active time period in which the transceiver 35 generates, transmits and receives the electromagnetic signals; and an inactive time period in which the transceiver 35 does not generate, transmit and receive the electromagnetic signals.

FIGS. 4A-D are schematic illustrations of current flow through a portion of the electric circuit of the field device 2 in FIG. 3 for different exemplary operating conditions.

Figure 4A:
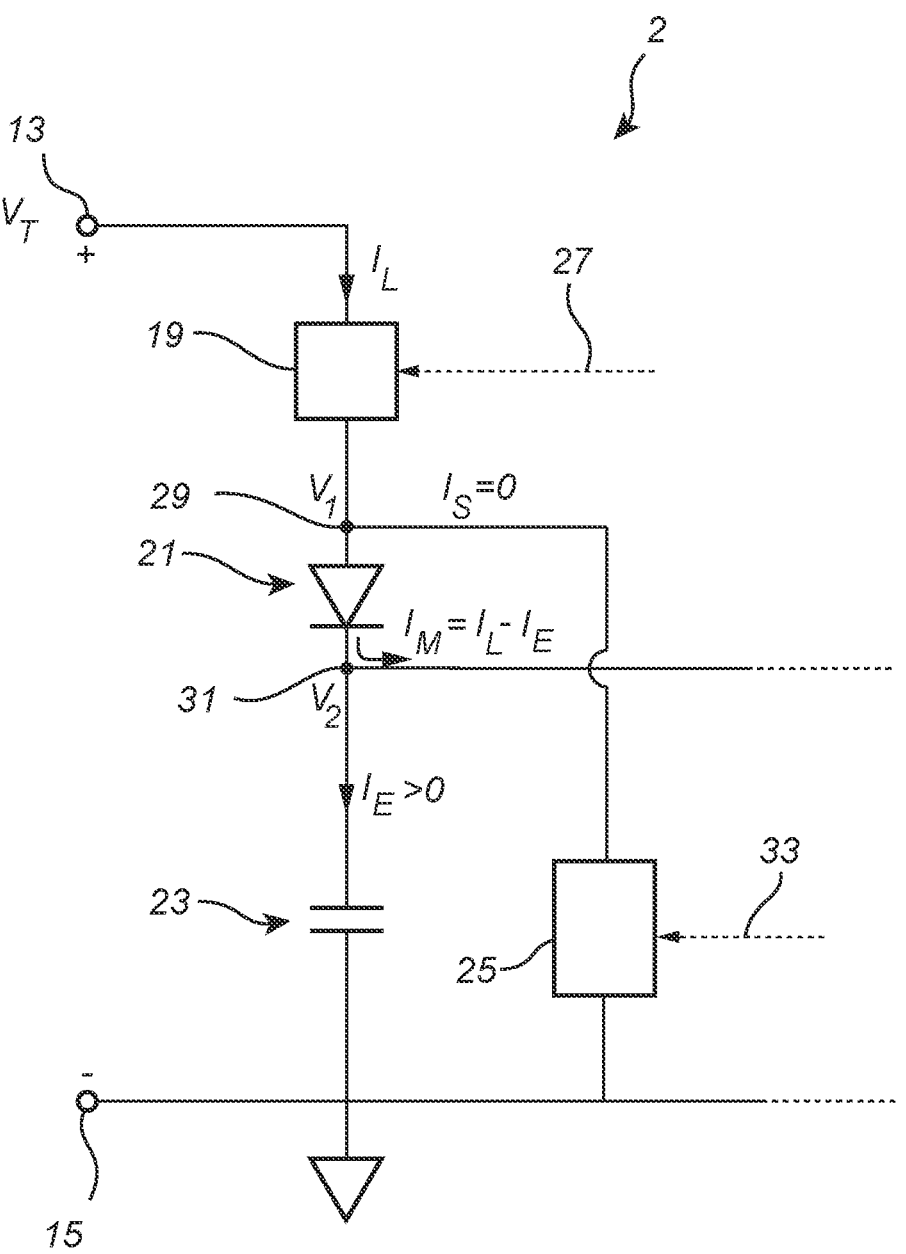
FIGS. 4A-D are schematic illustrations of current flow through the electric circuit of the field device in FIG. 3 for different exemplary operating conditions.

In a first scenario schematically shown in FIG. 4A, the energy storage device 23 has remaining storage capacity—in other words, the voltage $V_1$ (the potential at the first node 29 in relation to the potential at the second loop terminal 15) across the controllable shunt regulator 25 has not reached the shunting voltage set by the measurement unit, there is more power on the current loop than is required to operate the measurement unit, and there are no substantial changes in the loop current $I_L$.

In this case, as is also indicated in FIG. 4A, the shunt current $I_S$ is zero, the entire loop current $I_L$ is allowed to flow through the asymmetrically conducting device 21. At the second node 31, the loop current $I_L$ is divided into the current $I_M$ provided to the measurement unit for operation thereof, and the charging current $I_E$ received by the energy storage device 23.

Figure 4B:
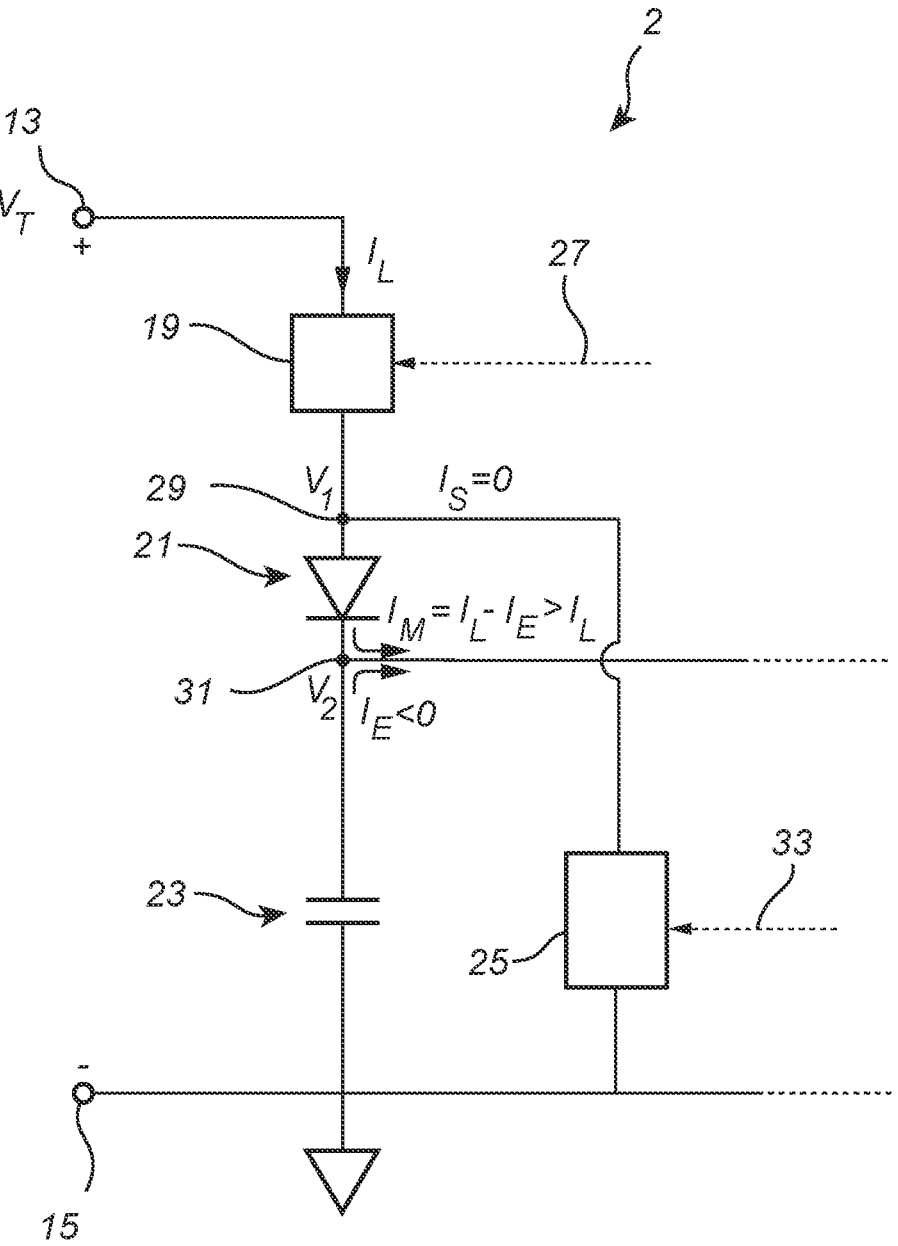

In a second scenario schematically shown in FIG. 4B, there is less power on the current loop than is required to operate the measurement unit, and there are no substantial changes in the loop current $I_L$.

In this case, as is also indicated in FIG. 4B, the shunt current $I_S$ is zero, the entire loop current $I_L$ is allowed to flow through the asymmetrically conducting device 21. At the second node 31, the loop current $I_L$ is joined by a negative charging current $I_E$ (a discharge current) to form the current $I_M$ provided to the measurement unit for operation thereof. Accordingly, in this second scenario, power is provided from the energy storage device 23 to contribute to the power needed for operation of the measurement unit. This discharge of energy storage device 23 results in a reduction of the voltage across the energy storage device 23.

Figure 4C:
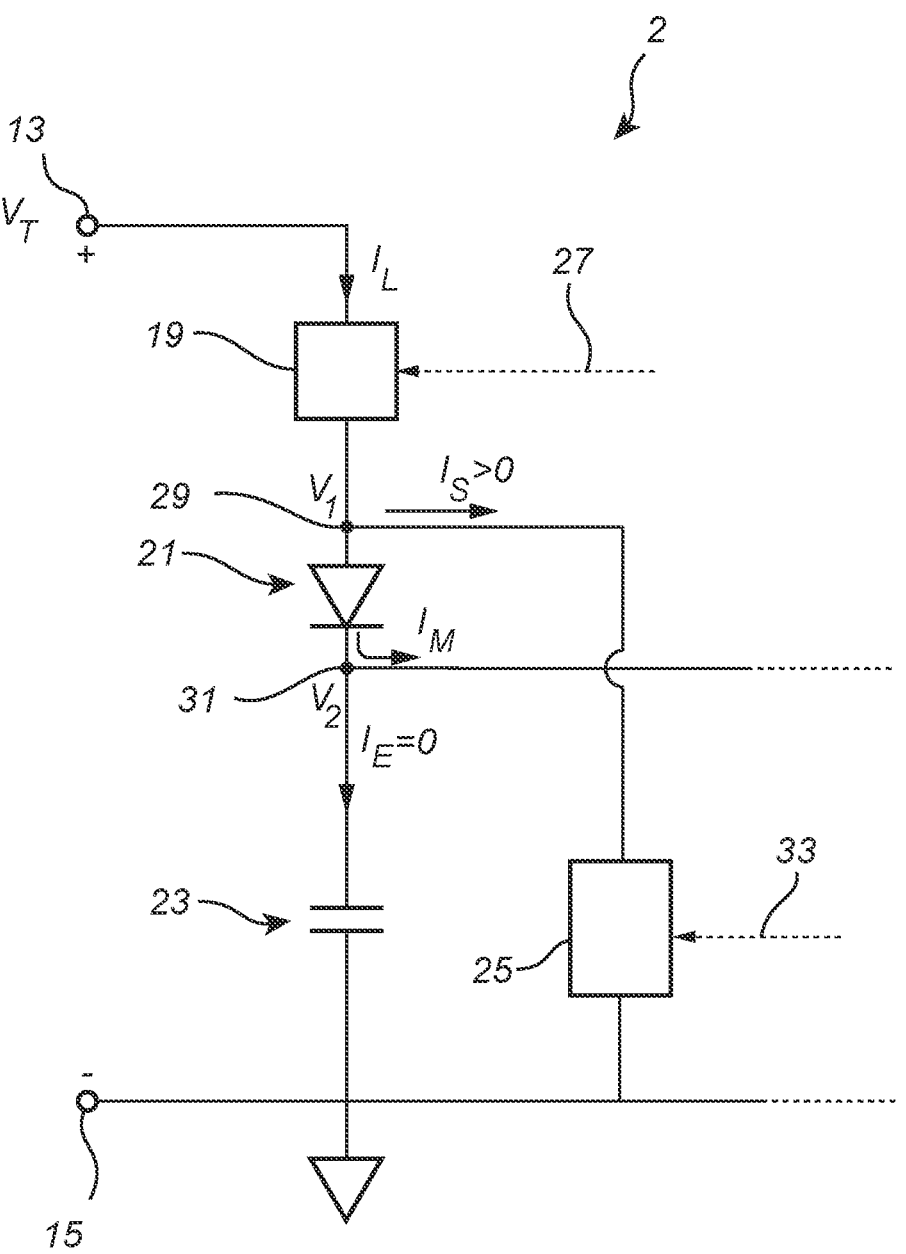

In a third scenario schematically shown in FIG. 4C, the energy storage device 23 is "full"—in other words, the voltage $V_1$ (the potential at the first node 29 in relation to the potential at the second loop terminal 15) across the controllable shunt regulator 25 has reached the shunting voltage set by the measurement unit, there is more power on the current loop than is required to operate the measurement unit, and there are no substantial changes in the loop current $I_L$.

In this case, as is also indicated in FIG. 4C, the loop current $I_L$ is divided at the first node 29 between a non-zero shunt current $I_S$ passing through the controllable shunt regulator 25, and the current $I_M$ for operation of the measurement circuitry. The current $I_M$ for operation of the measurement circuitry is allowed to flow through the asymmetrically conducting device 21 and towards the measurement unit. Since the energy storage device 23 is "full", the charging current $I_E$ is zero.

Figure 4D:
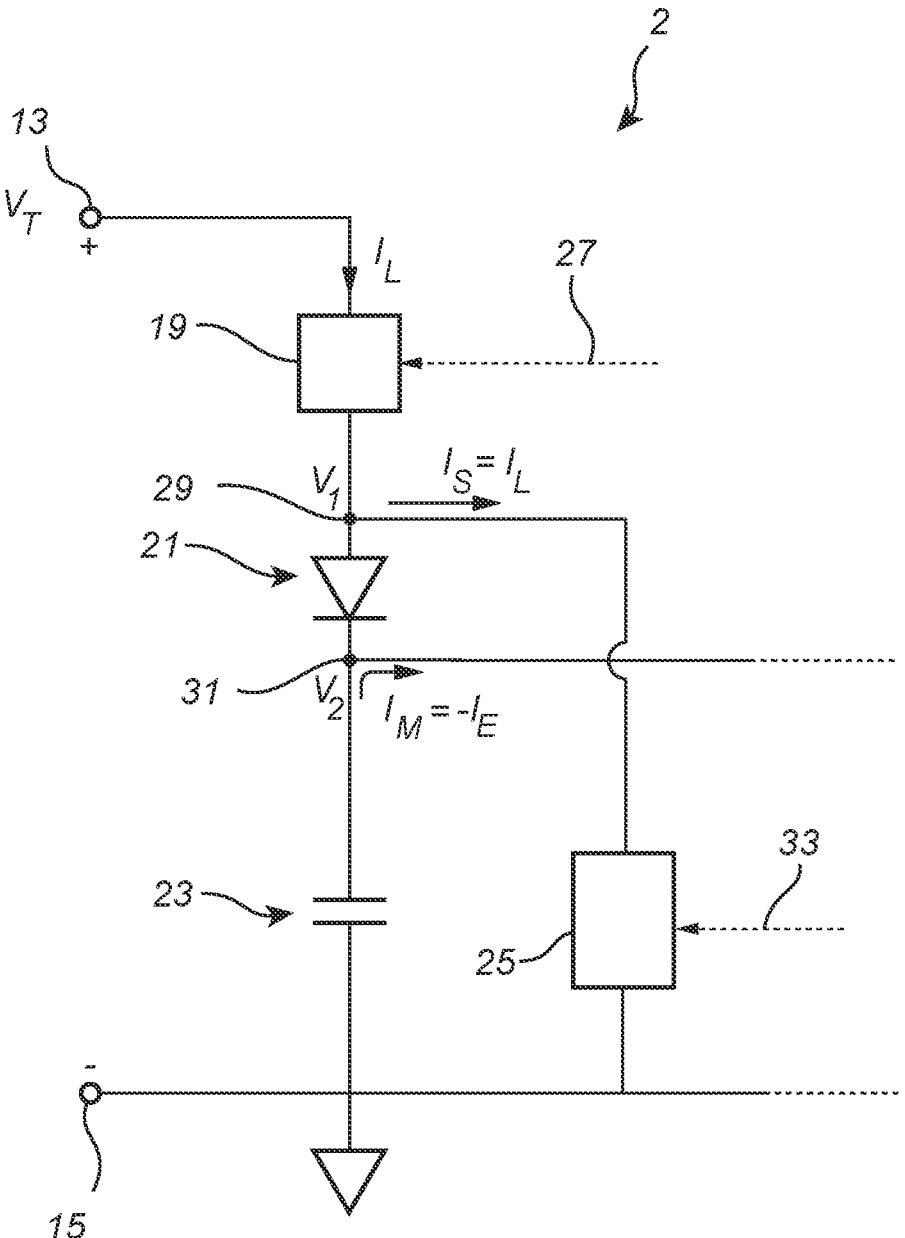

In all of the first to third scenarios described above, the field device 2 has been described as being in, more or less, steady state operation, with current flowing through the asymmetrically conducting device 21. With reference to FIG. 4D, a fourth scenario will now be described, in which the configuration of the field device 2 according to embodiments of the present invention provides advantageous properties.

In the fourth scenario schematically shown in FIG. 4D, the energy storage device 23 is "full" (or almost "full"), and the measurement unit has just controlled the loop current control device 19 to increase the loop current $I_L$. Since an increase in loop current $I_L$ results in a decrease of the terminal voltage VT, for reasons explained further above in connection with FIG. 3, the measurement unit has also controlled the controllable shunt regulator 25 to reduce the shunting voltage of the controllable shunt regulator 25. A reason for doing this is to maintain the voltage across the loop current control device 19 at a constant value for ensuring proper performance of the loop current control device 19. In the field device configuration of FIG. 4D, the result is that the potential $V_1$ at the first node 29 has become lower than the potential $V_2$ at the second node 31. Since the asymmetrically conducting device 21 does not permit current to flow through the asymmetrically conducting device 21 from the second node 31 towards the first node 29, the controllable shunt regulator 25 can thus quickly control the potential $V_1$ at the first node 29 to such a level as to maintain the desired constant voltage across the loop current control device 19.

In this case, the entire loop current $I_L$ is passed through the controllable shunt regulator 25, and the current $I_M$ for operating the measurement unit is taken solely from the energy storage device 23.

Without the provision of the asymmetrically conducting device 21, it would have been necessary to discharge the energy storage device 23 through the controllable shunt regulator 25 until the voltage across the energy storage device 23 was sufficiently low to allow proper operation of the loop current control device 19. As the energy storage device 23 may be configured to store a substantial amount of energy, this would require the controllable shunt regulator 25 to support a very high current and/or take time. This would result in current transients on the current loop and/or in a temporary inability to control the loop current $I_L$ to the desired value. In addition, stored energy would be wasted.

Through embodiments of the present invention, these and other drawbacks may be mitigated, providing for more efficient use of energy, improved signaling performance (in particular when using the HART-protocol), and a more cost-efficient configuration of the controllable shunt regulator.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A field device for determining a process variable and providing the process variable to a remote location via a two-wire current loop, the field device comprising:
   a first loop terminal and a second loop terminal for connection of the field device to the two-wire current loop in such a way that a loop current flows through an electric circuit of the field device from the first loop terminal to the second loop terminal;
   a measurement unit for determining the process variable using energy received via the two-wire current loop for operation of the measurement unit;
   a loop current control device for controlling the loop current to encode the process variable determined by the measurement unit, the loop current control device being provided in the electric circuit between the first loop terminal and a first node of the electric circuit;
   an asymmetrically conducting device provided in the electric circuit between the first node of the electric circuit and a second node of the electric circuit, the asymmetrically conducting device being configured to allow current to flow through the asymmetrically conducting device from the first node towards the second node when a potential at the first node is higher than a potential at the second node, and to substantially prevent current to flow through the asymmetrically conducting device from the second node towards the first node when the potential at the second node is higher than the potential at the first node;
   an energy storage device for storing energy received via the two-wire current loop, the energy storage device being provided in the electric circuit between the second node of the electric circuit and the second loop terminal; and
   a controllable shunt regulator provided in the electric circuit between the first node of the electric circuit and the second loop terminal, in parallel with the energy storage device and the asymmetrically conducting device,
   wherein the measurement unit is provided in the electric circuit between the second node of the electric circuit and the second loop terminal in parallel with the energy storage device.

2. The field device according to claim 1, wherein the energy storage device comprises a capacitor.

3. The field device according to claim 1, wherein the measurement unit is operatively coupled to the controllable shunt regulator, and configured to control a shunting voltage of the shunt regulator.

4. The field device according to claim 3, wherein the measurement unit is configured to control the controllable shunt regulator to decrease the shunting voltage of the shunt regulator in response to an increase of the loop current.

5. The field device according to claim 3, wherein the measurement unit is configured to control the controllable shunt regulator to increase the shunting voltage of the shunt regulator in response to a decrease of the loop current.

6. The field device according to claim 1, wherein the asymmetrically conducting device exhibits diode characteristics.

7. The field device according to claim 1, wherein the asymmetrically conducting device comprises a diode.

8. The field device according to claim 1, wherein the measurement unit is operatively coupled to the loop current control device, and configured to control the loop current control device.

9. The field device according to claim 1, wherein the field device is a radar level gauge for determining a filling level of a product in a tank, the measurement unit of the radar level gauge comprising:
   a transceiver for generating, transmitting and receiving electromagnetic signals;
   a propagating device connected to the transceiver for propagating an electromagnetic transmit signal from the transceiver towards a surface of the product and for returning to the transceiver an electromagnetic reflection signal resulting from reflection of the transmit signal at the surface; and
   processing circuitry for determining the filling level based on the transmit signal and the reflection signal, and for controlling the loop current control device to control the loop current to encode the filling level.

10. The field device according to claim 9, wherein the processing circuitry is configured to control the transceiver to perform a plurality of measurement cycles, each measurement cycle including:
   an active time period in which the transceiver generates, transmits and receives the electromagnetic signals; and
   an inactive time period in which the transceiver does not generate, transmit and receive the electromagnetic signals.

* * * * *